United States Patent Office 3,718,201
Patented Feb. 27, 1973

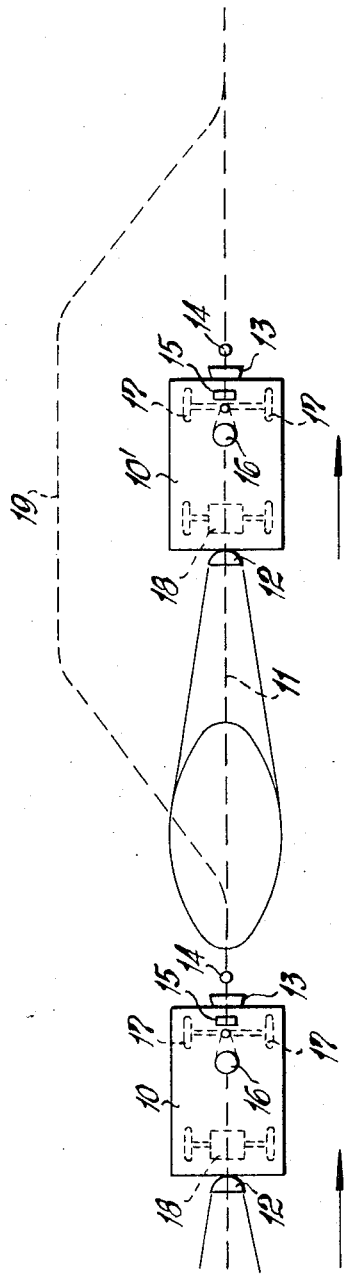
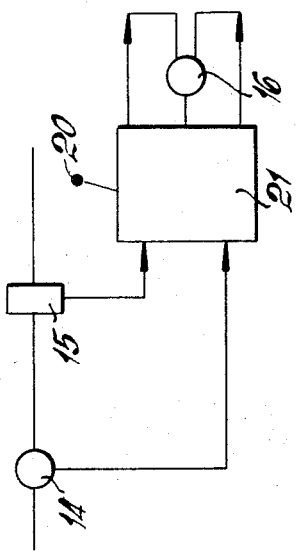

3,718,201
ARRANGEMENT FOR AUTOMATICALLY CONTROLLING THE MOVEMENT OF MOTOR VEHICLES
Richard Schleupen, Grossingersheim, and Ferdinand Grob, Stuttgart, Germany, assignors to Robert Bosch GmbH, Stuttgart, Germany
Filed Oct. 7, 1970, Ser. No. 78,674
Claims priority, application Germany, Oct. 9, 1969, P 19 50 863.5
Int. Cl. B60k 27/06
U.S. Cl. 180—98        8 Claims

ABSTRACT OF THE DISCLOSURE

Vehicles moving along a predetermined conductor path have a frequency modulated spotlight on their rear ends and, on their front ends, a frequency selective receiver comprising a photocell, which, when shone upon, produces a signal that either stops the vehicle or shunts it onto a detour path to avoid a collision.

BACKGROUND OF THE INVENTION

The invention relates to an arrangement for automatically controlling the movement of a plurality of motor vehicles.

Among known arrangements for automatically controlling vehicles are those having, buried in the path of the vehicles, a conductor that the vehicles follow. The conductor is electrically energized at at least one frequency, the resulting field inducing a voltage in pickup coils carried by the vehicles, which are steered in dependence upon the amplitude and/or phase of the induced voltage. These arrangements cannot, however, detect the danger of a collison between two vehicles.

To prevent collisions, the conductors of these known systems are divided into sections. Once a vehicle has passed through a section, the conductor of this section is de-energized so that a following vehicle is brought to a stop.

A disadvantage of this scheme is that the equipment necessary for energizing and de-energizing the sections is expensive and complex.

SUMMARY OF THE INVENTION

An object of the invention is an arrangement for automatically controlling the movement of vehicles, the arrangement providing a simple solution to the problem of preventing collisions between vehicles. Another object of the invention is the arrangement of the aforesaid object, wherein one vehicle is free to pass another.

The invention consists essentially of at least two motor vehicles, a transmitter of electromagnetic radiation arranged on each of these vehicles, a receiver arranged on each of the vehicles, the receiver of each one of the vehicles being adapted to be responsive to the radiation of the transmitter of the other vehicle when the distance between the vehicles falls below a predetermined minimum, and control means on each of the vehicles and actuated by the receiver on the respective vehicle when responsive to radiation for delivering a control signal indicative of the fact that the distance between the vehicles has fallen below the predetermined minimum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a top view schematically showing the arrangement of the invention; and FIG. 2 schematically shows the steering control for operating the steering motor.

DESCRIPTION OF THE PREFERRED EMBODIMENTS

With reference to FIG. 1, there are shown two motor vehicles 10 and 10', which move over a first vehicle path defined by first conductor 11 that is electrically energized at a determined frequency to produce a field. Each of the vehicles 10 and 10' has a transmitter 12, of which the spotlight is shown, and radiation-responsive control means 13. In the embodiment described, the control means 13 is preferably frequency selective, although it can also be phase or amplitude selective. In the present instance, the transmitter 12 comprises an incandescent lamp of which the filament current can be changed at a determined frequency, so as to vary the light output of the spotlight at this frequency. The incandescent lamp filament can also be phase or amplitude modulated. In the simplest case, the control means or receiver 13 is a photocell, which produces a current that is conducted to an amplifier tuned to the frequency at which the light output of the spotlight 12 varies. The current through the amplifier constitutes a control signal and in turn stops the drive motor 18 constituting controllable drive means of the rear vehicle 12, as will be apparent. A suitable frequency selective amplifier is described, for example, in Elektrische Nachrichtentechnik, Volume II, page 442, published by Verlag Schroeder.

In a particularly simple embodiment, the spotlight can project a beam of light of very long wavelength, the photocell chosen being sensitive only to this light.

The direction of movement of the two vehicles 10 and 10' is denoted by the two arrows. The transmitter 12 is mounted on the rear end of the vehicles 10 and 10', while the frequency selective receiver 13 is mounted on the front end of each of these vehicles. The movement of the vehicles along the conductor 12 is governed by two coils 14 and 15, which are mounted on each of the vehicles, these coils, in accordance with the amplitude and phase of the voltages induced in them, controlling a steering motor 16, which moves the wheels 17 of the vehicle 10 or 10' in dependence on the deviation from the conductor 11. The components illustrated in FIG. 2 constitute controllable steering means according to the invention.

During the course of the further explanation of the invention, it will be assumed that the vehicle 10' is stopped to load or to unload, while the other vehicle 10 is approaching the stopped vehicle. The spotlight transmitter 12 of the vehicle 10' casts a beam of frequency modulated light downwards onto the vehicle path, forming an elliptical field that illuminates the path. If the trailing vehicle 10 comes sufficiently near to the stopped leading vehicle 10' so that the frequency selective receiver 13 (a photocell connected to a tuned amplifier) is shone upon, the receiver 13 produces a signal that turns off the drive motor 18 of the vehicle 10. The inclined path of the light beam insures that the drive motor is turned off at a precise disstance of separation between the two vehicles.

In the simplest case, the steering motor 16 is a direct current motor, the poles of which can be reversed in dependence upon the direction of deviation from the conductor 11. Depending on the polarity of the motor, the wheels 17 are turned in one or the other direction.

If it is essential that the vehicle 10 continue to move forward, even though the vehicle 10' is stopped, there is provided a second detour vehicle path defined by second conductor 19 that is energized at a second frequency different from the first frequency of conductor 11. If the vehicle 10 approaches the stopped vehicle 10', the receiver 13 of the vehicle 10 produces a signal, which is conducted to the terminal 20 of the steering control 21 of the vehicle 10. The steering control 21, shown in FIG. 2, is connected to two coils 14 and 15, which are carried by the vehicle 10 over the conductor 11 buried in the vehicle path. The steering control 21, which operates the steering motor 16 of the vehicle 10 in dependence on the deviation from the conductor 11, is controlled by the amplitude and phase of the voltages induced in the coils 14 and 15. The steering control 21 is so designed that the vehicle follows only one desired frequency, that is to say, one desired conductor 11 or 19. The steering motor 16 and especially the steering control 21 are further described in the following two U.S. patent applications, Ser. No. 804,061, filed Mar. 3, 1969, and Ser. No. 804,062, of the same date.

If the transmitter 12 of vehicle 10' shines upon the receiver 13 of the vehicle 10, the signal conducted to the terminal 20 from the receiver 13 switches the frequency of the steering control 21 to the frequency of the conductor 19, whereby the vehicle 10 now follows the path of the latter conductor and is led around the stopped vehicle 10'. Details of this kind of steering of the vehicles, which form no part of the present invention, can be found in the two aforesaid patent applications.

In accordance with the invention, any suitable transmitter and receiver of electromagnetic radiation can be used.

The beam of the electromagnetic radiation is advantageously a semi-circle in cross-section, so that the distance at which the approaching vehicle is controlled to prevent a collision is the same whether the path is straight or curved.

It will be understood that each of the elements described above, or two or more together, may also find a useful application in other types of constructions and circuits differing from the types described above.

While the invention has been illustrated and described as embodied in an arrangement for automatically controlling the movement of motor vehicles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A vehicle guidance system comprising means defining a first predetermined vehicle path; means defining a second predetermined vehicle path branching off from said first predetermined vehicle path at a predetermined point thereof; a leading vehicle and a trailing vehicle, each provided with controllable drive means for propelling the respective vehicle and activatable by control signals for stopping the respective vehicle, and each provided with controllable steering means for normally steering the respective vehicle along said first predetermined vehicle path and activatable by control signals for steering the respective vehicle at said predetermined point away from said first predetermined vehicle path and along said second predetermined vehicle path; a transmitter on said leading vehicle for transmitting electromagnetic radiation directed at an angle to the surface of said first predetermined vehicle path; and radiation-responsive control means on said trailing vehicle receiving said transmitted electromagnetic radiation when said radiation-responsive control means are exposed to said electromagnetic radiation directed at an angle to the surface of said first predetermined vehicle path, said radiation-responsive control means connected with the controllable means on said trailing vehicle, and generating control signals when the distance between said transmitter and said control means falls below a predetermined minimum and furnishing said control signals to one of said controllable means either for stopping said trailing vehicle or for steering said trailing vehicle at said predetermined point away from said first predetermined vehicle path and along said second predetermined path.

2. An arrangement as defined in claim 1, wherein said transmitter amplitude modulates said electromagnetic radiation and said receiver is amplitude selective to respond to said radiation.

3. An arrangement as defined in claim 1, wherein said transmitter frequency modulates said electromagnetic radiation and said control means is frequency selective to respond to said radiation.

4. An arrangement as defined in claim 1, wherein said radiation-responsive control means includes a photosensitive element.

5. An arrangement as defined in claim 1, wherein said transmitter phase modulates said electromagnetic radiation and said radiation-responsive control means is phase selective to respond to said radiation.

6. An arrangement as defined in claim 1, wherein said means defining said vehicle path comprise conductor means extending in direction of said paths and radiating an electromagnetic field of at least one predetermined frequency.

7. An arrangement as defined in claim 1, wherein each of said vehicles is provided on its respective rear end with said transmitter and on its respective front end with said radiation-responsive control means.

8. An arrangement as defined in claim 1, wherein said means defining said first and second paths comprise first and second conductor means respectively energized at first and second frequencies, and wherein said controllable steering means normally steers the respective vehicle along a path defined by a conductor energized at said first frequency and is activatable by said control signals for steering the respective vehicle along a path defined by a conductor energized at said second frequency.

References Cited

UNITED STATES PATENTS

| 2,847,080 | 8/1958 | Zworykin et al. | 180—98 |
| 3,152,317 | 10/1964 | Mayer | 180—98 X |
| 3,011,580 | 12/1961 | Reid | 180—98 |
| 1,983,882 | 12/1934 | Rosenfeld | 180—98 |
| 3,235,025 | 2/1966 | Quinn | 180—98 |
| 3,512,601 | 5/1970 | Wilson | 180—98 |
| 2,188,293 | 1/1940 | Williams | 180—98 |

KENNETH H. BETTS, Primary Examiner

J. P. SILVERSTRIM, Assistant Examiner

U.S. Cl. X.R.

180—79.1; 188—110; 325—102, 117; 340—258